July 14, 1970            S. MANN            3,520,189
FLOATABLE THERMOMETER
Filed June 24, 1968
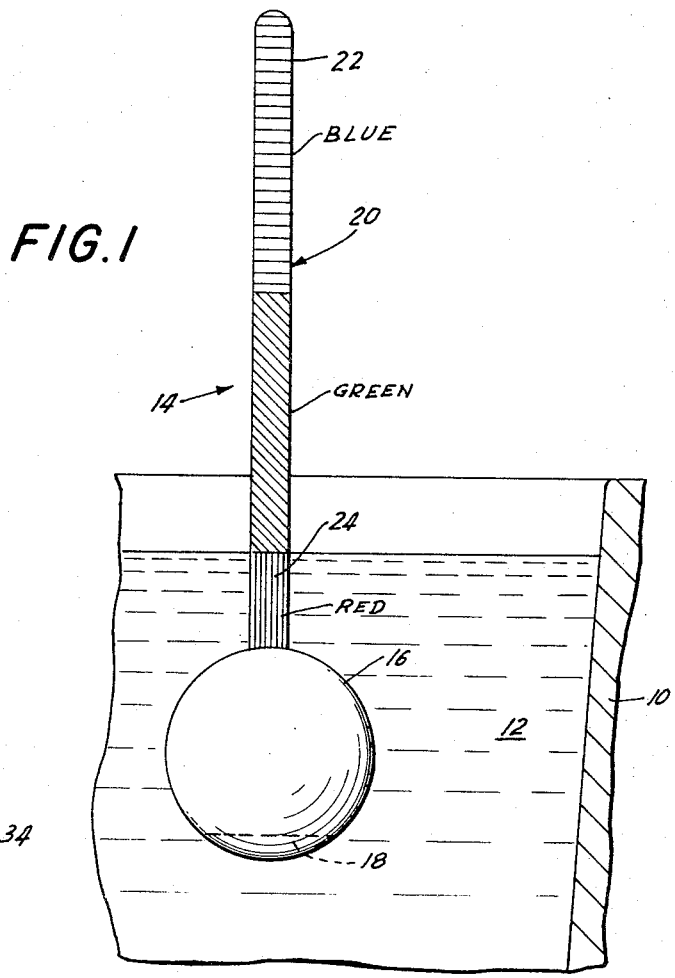
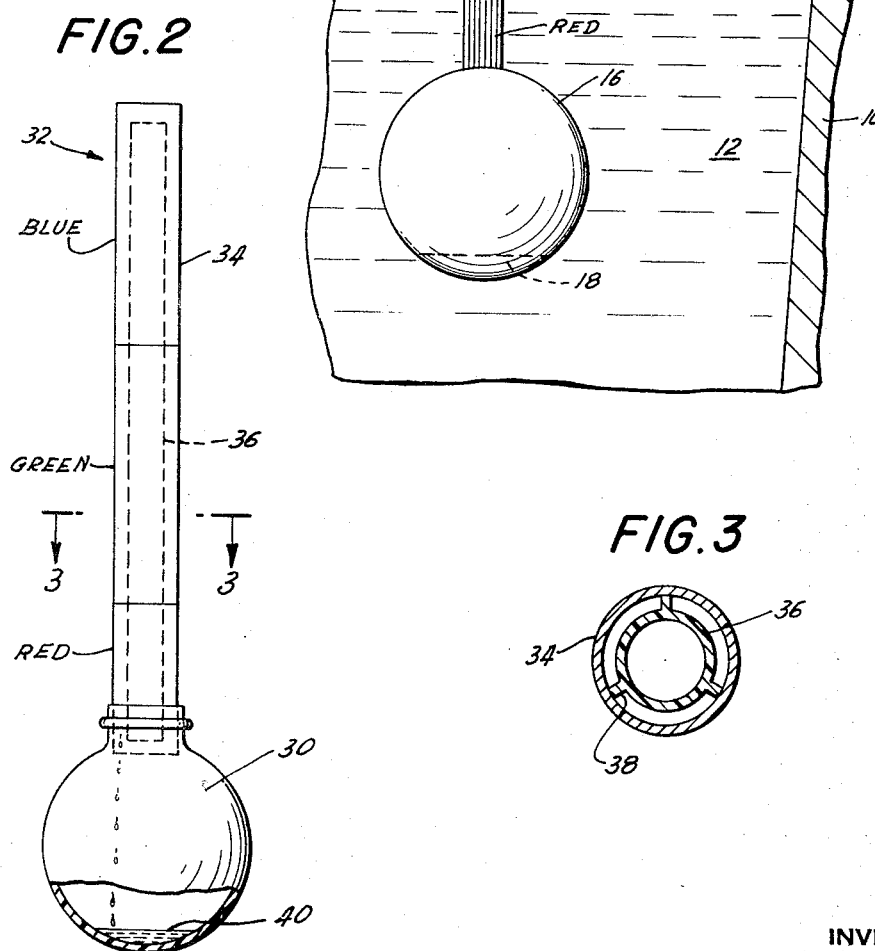
INVENTOR
SEYMOUR MANN
BY Fred Lederer
ATTORNEY United States Patent Office
3,520,189
Patented July 14, 1970

3,520,189
FLOATABLE THERMOMETER
Seymour Mann, 940 Park Ave.,
New York, N.Y. 10028
Filed June 24, 1968, Ser. No. 739,441
Int. Cl. G01k 5/32, 11/04
U.S. Cl. 73—368         11 Claims

ABSTRACT OF THE DISCLOSURE

A floatable thermometer adapted to be partially submerged in a liquid whose temperature is to be indicated. The thermometer includes fluid which expands and contracts during temperature changes. An enclosure means encloses the fluid for automatically expanding and contracting in response to expansion and contraction of the fluid. This enclosure means has a predetermined maximum cross-sectional area, and an elongated indicator which has a cross-sectional area substantially smaller than this maximum cross-sectional area of the enclosure means is fixed to and projects upwardly from the latter. A weight means is located in the enclosure means, and the total weight of the weight means, enclosure means, fluid and indicator is such that when the thermometer is in a liquid the enclosure means will be submerged beneath but adjacent the surface of the liquid with the indicator projecting upwardly beyond the surface of the liquid. During temperature changes the thermometer will rise and fall so that the extent to which the indicator extends above the surface of the liquid will be indicative of the temperature.

BACKGROUND OF THE INVENTION

The present invention relates to thermometers.

In particular, the present invention relates to thermometers which are adapted to float in a liquid whose temperature is to be sensed.

Although structures of this general type are known, they usually include conventional thermometers carried by floats which float on the surface of the liquid so as to support the thermometer in a position where it projects partly down into the liquid to sense the temperature thereof.

Structures of this latter type suffer from several drawbacks. Thus, in the case of glass thermometers which have a liquid therein, there is the possibility of breakage so that such structures cannot be used in many cases. For example, in a child's bath, such a structure would be dangerous to use. When attempts are made to protect the thermometer by suitable covering structure in the form of an armor, the resulting assembly is difficult to read, is bulky, and is undesirably expensive. Furthermore, with such constructions it is obviously undesirable to have mercury or alcohol, which are toxic materials, in a bath near children.

It is accordingly a primary object of the present invention to provide a thermometer which will avoid the above drawbacks.

In particular, it is an object of the present invention to provide a thermometer which does not require use of a conventional thermometer structure.

In addition, it is an object of the present invention to provide an exceedingly simple structure capable of responding to temperature changes in a liquid for indicating the temperature thereof.

Furthermore, it is an object of the invention to provide a construction which is safe to use, so that, for instance, injury practically cannot occur to children in a bath where the thermometer of the invention is used.

Also, it is an object of the invention to provide a construction which may serve as a toy or novelty device for entertaining a child, for example.

SUMMARY OF THE INVENTION

In accordance with the present invention a fluid which expands and contracts during temperature changes is enclosed within an enclosure means of yieldably resilient material which also automatically expands and contracts in response to contraction and expansion of the fluid. This enclosure means has a predetermined maximum cross-sectional dimension, and an elongated indicator which has a cross-sectional dimension much smaller than this maximum dimension is fixed to and projects upwardly from the enclosure means. A weight means is located in the interior of the enclosure means resting on the bottom thereof, so that when the entire thermometer assembly is used with the enclosure means submerged in a liquid adjacent the surface thereof, the weight means will maintain the indicator in an upright position extending upwardly beyond the enclosure means and upwardly beyond the surface of the liquid. The total weight of the weight means, enclosure means, fluid and indicator is such that when the thermometer assembly is immersed in a liquid the enclosure means will become submerged beneath but situated adjacent the surface of the liquid with the elongated indicator extending from the enclosure means upwardly through and beyond the surface of the liquid. Thus, as the enclosure means expands and contracts during temperature changes, the entire thermometer assembly will rise and fall, and the extent to which the indicator projects above the surface of the liquid will be an indication of the temperature.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows in elevation one possible embodiment of a thermometer according to the invention, the thermometer being schematically illustrated in a liquid whose temperature is to be sensed;

FIG. 2 is a partly broken away elevation of another embodiment of a thermometer according to the invention; and FIG. 3 is a transverse sectional plan view taken along line 3—3 of FIG. 2 in the direction of the arrows and showing the indicator structure at a scale which is enlarged as compared to FIG. 2.

DESCRIPTION OF THE PREFERRED EMBODIMENTS

Referring now to the drawings, there is schematically illustrated in FIG. 1, a bath 10 containing a liquid 12 whose temperature is to be sensed. If desired, this bath 10 may be a bath in which a child is bathed, and the liquid 12 is simply water at an elevated temperature, the thermometer assembly 14 of the invention being used to indicate to the mother of the child, for example, the temperature of the water 12.

The thermometer 14 of the invention includes an enclosure means 16 in the form of a bag of spherical configuration. Within this enclosure means 16 is located a fluid of the thermometer which has the property of expanding and contracting during temperature changes. This fluid may be a volatile liquid or a gas which is preferably non-toxic, such as air, water vapor, alcohol vapor, or the like. With fluids of this latter type, the fluid in liquid form can act as a weight means 18, although it is also possible to use a solid particulate weight such as particles in the form of glass beads, sand, or the like. The enclosure means may be made of any flexible elastomer which is impervious to liquid and gas, such as rubber (natural or synthetic), polyvinylchloride, polyethylene, etc., and will not be affected by the bath and the fluid.

An indicator 20, for instance in the form of an elongated hollow tube made of any rigid plastic, metal, wood, or the like, or in the form of a flat stick, is fixed to and extends upwardly from the enclosure means 16. It will be noted that the indicator 20 has a cross-sectional area which is substantially smaller than and, according to a preferred embodiment of the present invention, only a small fraction of the maximum cross-sectional area of the enclosure means 16.

The indicator by its shape or composition or both should displace a weight of water greater than its own weight, so that upon upward movement of the indicator causing a larger portion thereof to be located outside the bath, a gravitational force comes into play opposing and reducing the rate of upward movement of the indicator. If the indicator by its shape and specific gravity is uniform throughout its length, the rise or fall of the indicator or the length of the portion thereof extending upwardly from the bath surface will be directly proportional to changes in the bath temperature.

The total weight of the fluid within the enclosure means 16, the enclosure means 16 itself, the weight means 18 and the indicator 20 is such that when the thermometer 14 is placed in the liquid 12 the enclosure means 16 becomes submerged beneath but is situated adjacent to the surface of the liquid. Thus, the weight of the entire thermometer 14 is such that it will displace an amount of the liquid 12 equal to its own weight when the enclosure means 16 is situated beneath but adjacent to the surface of the liquid. As the temperature of the liquid rises the fluid within the enclosure means 16 will expand and stretch the yieldably resilient wall of the enclosure so as to increase the volume thereof, thus tending to displace more liquid, and the result is that the indicator 15 will rise with the enclosure means 16 and the fluid and weight means therein so that the amount of displaced liquid still remains equal to the weight of the entire thermometer 14. On the other hand, when the temperature of the liquid 12 drops, the volume of the enclosure means 16 will automatically diminish, thus automatically contracting enclosure means 16 in response to contracting of the fluid therein, and now the entire thermometer will necessarily move downwardly through a given distance in the liquid until the volume of liquid displaced again equals the weight of the entire thermometer. In this manner, because of the smaller cross-sectional area of the indicator, particularly in relation to the maximum cross-sectional area of the enclosure means 16, it is possible to achieve a very substantial rising and falling of the indicator with respect to the surface of the liquid during relatively small temperature changes of the latter, and the extent to which the indicator 20 extends above the surface of the liquid will serve as an indication of the temperature thereof.

Suitable indicia may be carried at the exterior of indicator 20 to indicate the temperature. For this purpose the upper portion 22 of the indicator 20 may be colored blue, while the lower portion 24 thereof may be colored red, and an intermediate portion 26 may be colored green. With such an arrangement, when the thermometer is used in a child's bath, it will be known, for example, that as long as the green area of the indicator is at the surface of the liquid the temperature thereof is suitable. If the red area projects above the surface of the liquid, then the temperature thereof is too high, while if only the blue color projects above the surface of the liquid, the liquid 12 is too cold.

In the embodiment of the invention which is shown in FIG. 2, there is also a plastic enclosure means 30 in the form of an elastomeric bag of spherical configuration clamped at its top end to the exterior surface of the elongated indicator 32 in the form of an outer metal tube 34 made of any good thermally conductive material such as aluminum. As is apparent from FIG. 3, there is located within the metal tube 34 a plastic tube 36 which is not a good thermal conductor. In order to fix the tube 36 within the tube 34 this tube 36 may have outwardly projecting ribs 38 frictionally engaging the inner surface of the tube 34 to maintain the tube 36 therein. The inner volume of the tube 36 is substantially greater than the volume of the space between the tubes 34 and 36. The open top end of inner tube 36 is spaced below the closed top end of outer tube 34.

The weight means of this embodiment is in the form of a volatile liquid such as water, alcohol, fluorinated hydrocarbons, or any other, preferably non-toxic, low-boiling liquid compatible with the material of enclosure means 30. It is also possible to use solid particles as a weight means, such as charcoal in the form of pellets with liquid incorporated into the charcoal which will vaporize out of the pellets during an increase in temperature. However, it is also possible to use a gas as the fluid and glass beads or lead shot to serve as the weight means. It is also possible to use camphor, moth balls or the like which have a high vapor pressure even though they are solids. In the case of charcoal, the latter contains a liquid which is absorbed in it and which is capable of releasing a vapor during an increase in temperature.

With the structure of this type the vapor will rise for the most part along the interior of the plastic tube 36 which has its open top end spaced from the closed top end of the exterior metal tube 34. As the vapor flows over the top end of the inner tube 36 to engage the metal tube 34, the latter which is in contact wih tthe outer atmosphere above the liquid is at a lower temperature to cause the vapor to condense and to form droplets which flow down along the interior surface of the metal tube and fall from the latter back to the bottom enclosure means 30. As a result of this operation not only will the enclosure means 30 expand and contract due to temperature changes to achieve the above results of rising and falling of the indicator 32 to indicate the temperature, but in addition the falling droplets may cause the entire thermometer to bob in the liquid providing an entertaining toy for a child in a bath.

Although there are certain inherent inaccuracies in a thermometer of this type, it is sufficiently accurate for use, for instance, in a child's bath. Such inaccuracies will result, for example, from changes in barometric pressure as well as changes in the pressure of the head of liquid pressing against the expandable and contractable enclosure means and varying with the depth of the latter in the liquid. These inaccuracies are relatively minor and of such small magnitude that they will have no practical influence on the use of the device as a thermometer for a child's bath where the temperature is indicated by colors such as those shown in FIG. 1 and described above. However, it is a simple matter to provide the structure with a precisely determined weight means in the interior of the expandable and contractable enclosure means and with a scale which compensates for inaccuracies of the above type so that the thermometer of the invention also can be used under conditions where a higher degree of accuracy is required.

If desired, the flexible bag which forms the enclosure means may be surrounded by a metal or plastic screen for design purposes.

It will be understood that each of the elements described above, or two or more together, may also find a useful application in other types of temperature indicating devices differing from the types described above.

While the invention has been illustrated and described as embodied in a thermometer and toy for use in a child's bath, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A thermometer comprising a fluid which expands and contracts in response to temperature changes, enclosure means having a yieldably resilient wall, said enclosure means enclosing said fluid and said wall automatically expanding and contracting in response to change in pressure of the fluid with a change in temperature, said enclosure means having a predetermined maximum cross-sectional area, an elongated indicator fixed to and extending away from said enclosure means and having a cross-sectional area substantially smaller than said maximum cross-sectional area of said enclosure means, and weight means in said enclosure means for maintaining said elongated indicator in a substantially upright position extending upwardly from said enclosure means when the latter is submerged in a liquid, said fluid, enclosure means, indicator, and weight means having a total weight which maintains said enclosure means completely submerged in said liquid beneath but adjacent to the surface thereof with said indicator extending through a substantial distance upwardly from the enclosure means through the surface of the liquid so that in response to volumetric changes of said enclosure means during said temperature changes said indicator will rise and fall with respect to the surface of the liquid to provide by way of the length of the indicator portion which projects above the surface of the liquid an indication of the temperature thereof.

2. A thermometer as defined in claim 1, wherein said indicator has an exterior surface provided with indicia indicating the temperature of the liquid.

3. A thermometer as defined in claim 1, wherein said enclosure means is of substantially spherical configuration.

4. A thermometer as defined in claim 1, wherein said elongated indicator is in the form of a hollow tube.

5. A thermometer as defined in claim 1, wherein said fluid is in the form of a volatile liquid which vaporizes during an increase in temperature.

6. A thermometer as defined in claim 5, wherein said weight means is in the form of bodies in which the volatile liquid is located.

7. A thermometer as defined in claim 5, wherein said indicator is in the form of an elongated metal tube having an interior communicating with the interior of said enclosure means and into which the vapor flows to condense at the inner surface of said metal tube and fall back to the bottom of said enclosure means.

8. A thermometer as defined in claim 7, wherein an elongated plastic tube is situated within said metal tube and has an exterior surface spaced from the interior surface of said metal tube, said plastic tube having an interior volume substantially greater than the volume of the space between said tubes so that the greatest part of the vapor will rise upwardly along the interior of said plastic tube, said plastic tube having an open top end spaced from the closed top end of said metal tube so that the condensing liquid will flow along the inner surface of said metal tube downwardly in the space between said plastic and metal tubes.

9. A thermometer as defined in claim 1, wherein said wall consists of a flexible elastomer.

10. A thermometer as defined in claim 9, wherein said wall consists of rubber.

11. A thermometer as defined in claim 1, wherein said enclosure means essentially consist of a flexible elastomer.

References Cited

UNITED STATES PATENTS

| | | | |
|---|---|---|---|
| 792,588 | 6/1905 | Fulton | 73—368.2 |
| 1,523,096 | 1/1925 | Ziegler | 73—368 |
| 1,662,621 | 3/1928 | Reichold | 73—343 |
| 2,809,525 | 10/1957 | Savage | 73—353 XR |

LOUIS R. PRINCE, Primary Examiner

W. A. HENRY, Assistant Examiner

U.S. Cl. X.R.

73—353